(12) United States Patent
Erhart et al.

(10) Patent No.: US 9,531,880 B2
(45) Date of Patent: Dec. 27, 2016

(54) OPTIMIZATION IN WORKFORCE MANAGEMENT USING WORK ASSIGNMENT ENGINE DATA

(71) Applicant: Avaya, Inc., Santa Clara, CA (US)

(72) Inventors: George Erhart, Loveland, CO (US); Valentine C. Matula, Granville, OH (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/296,208

(22) Filed: Jun. 4, 2014

(65) Prior Publication Data
US 2015/0358468 A1 Dec. 10, 2015

(51) Int. Cl.
*H04M 3/00* (2006.01)
*H04M 3/523* (2006.01)
*H04M 3/51* (2006.01)

(52) U.S. Cl.
CPC ......... *H04M 3/5233* (2013.01); *H04M 3/5175* (2013.01)

(58) Field of Classification Search
CPC .................................................. H04M 3/5233
USPC ....... 379/265.01–265.14, 266.01–266.1, 309
See application file for complete search history.

(56) References Cited

U.S. PATENT DOCUMENTS

| | | | |
|---|---|---|---|
| 6,044,355 A * | 3/2000 | Crockett et al. | 705/7.39 |
| 6,108,782 A * | 8/2000 | Fletcher | G06F 8/65 370/245 |
| 6,266,400 B1 * | 7/2001 | Castagna | 379/88.25 |
| 6,373,836 B1 * | 4/2002 | Deryugin | G06Q 10/107 348/E7.082 |
| 6,870,926 B2 * | 3/2005 | Shambaugh et al. | 379/265.05 |
| 6,978,247 B1 * | 12/2005 | Bogart et al. | 705/7.12 |
| 7,369,653 B2 * | 5/2008 | Dezonno et al. | 379/265.02 |
| 7,860,810 B2 * | 12/2010 | Raffo | 706/6 |
| 7,949,552 B2 * | 5/2011 | Korenblit et al. | 705/7.13 |
| 8,126,017 B1 * | 2/2012 | Zave | 370/475 |
| 8,234,141 B1 | 7/2012 | Flockhart et al. | |
| 8,363,817 B2 | 1/2013 | McCormack et al. | |
| 8,577,706 B1 * | 11/2013 | Aykin | 705/7.11 |
| 8,688,684 B2 | 4/2014 | Steiner et al. | |
| 2003/0086553 A1 * | 5/2003 | Dezonno et al. | 379/265.02 |
| 2006/0140390 A1 * | 6/2006 | Dezonno | H04M 3/5232 379/265.12 |
| 2006/0212336 A1 * | 9/2006 | Powers et al. | 705/9 |
| 2007/0121897 A1 | 5/2007 | Patakula et al. | |
| 2007/0140468 A1 * | 6/2007 | Lebel | 379/265.05 |
| 2008/0097734 A1 * | 4/2008 | Raffo | 703/6 |
| 2010/0017251 A1 * | 1/2010 | Rawle et al. | 705/9 |
| 2010/0235218 A1 | 9/2010 | Erhart et al. | |
| 2010/0296417 A1 | 11/2010 | Steiner | |

(Continued)

*Primary Examiner* — William Deane, Jr.
(74) *Attorney, Agent, or Firm* — Sheridan Ross P.C.

(57) ABSTRACT

Contact centers strive to match the demands and preferences of their customers with the skills and abilities of the agents who process work items associated with the customers (e.g., contacts). However, the preferred agent may be unavailable, non-existent, backlogged or otherwise ineligible to accept the work item. An agent who is non-preferred but still qualified may be utilized to process the work item, such as an agent with adequate skills with respect to a particular attribute of the work item. Reports for the selection of the non-preferred but qualified agents are provided herein. A contact center may then utilize such reporting to identify underserved areas of their customer base.

20 Claims, 3 Drawing Sheets

(56) References Cited

U.S. PATENT DOCUMENTS

| | | |
|---|---|---|
| 2011/0125793 A1 | 5/2011 | Erhart et al. |
| 2011/0125826 A1 | 5/2011 | Erhart et al. |
| 2012/0020472 A1* | 1/2012 | Cutajar .................... 379/265.02 |
| 2013/0051547 A1* | 2/2013 | Chavez .................... 379/265.09 |
| 2013/0198039 A1* | 8/2013 | Sridharan et al. ......... 705/26.44 |
| 2013/0203439 A1* | 8/2013 | Lifshitz et al. ............ 455/456.2 |
| 2013/0223611 A1 | 8/2013 | Kohler et al. |
| 2013/0236002 A1 | 9/2013 | Jennings et al. |
| 2014/0079209 A1* | 3/2014 | Flockhart et al. ....... 379/265.09 |
| 2015/0117632 A1* | 4/2015 | Konig ................ H04M 3/5233 379/265.12 |
| 2015/0201078 A1* | 7/2015 | Khouri ................ H04M 3/5233 379/265.12 |

* cited by examiner

OPTIMIZATION IN WORKFORCE MANAGEMENT USING WORK ASSIGNMENT ENGINE DATA

FIELD OF THE DISCLOSURE

The present disclosure is generally directed toward reporting more particularly to reporting metrics in a contact center.

BACKGROUND

Workforce management ("WFM") solutions are often utilized to capture data from automatic call distribution ("ACD") systems on call volumes in each of a number of queues in a contact center. The queues may be associated with a particular skill. This, in turn, can be used to predict skills needed for future staffing of the contact center. As long as a work item is assigned to a, "correct skill(s) needed" queue to start, then "true" statistics can be collected from that queue on the "true" needs of incoming items.

In a contact center with a work assignment engine ("WAE"), work items may be held in an incoming work queue. Skill requirements may be assigned to the incoming work item, and so once again, statistics can be collected on each work item, and skills needed in the future staffing can be predicted.

A problem emerges when incoming work does not have all skills assigned. An example would be where incoming work item needs the skill, "reservations," but when looking up the customer relation management ("CRM") data for the customer, it is determined that the customer speaks, and prefers, to interact with agents in French. As the WAE assigns agents to work items, the WAE may find that in order to best serve the customer, the customer should be assigned to an English-only speaking agent. The English-only speaking agent processes the work item and the associated statistics show that work item as being successfully processed by a the English speaking agent.

In another situation, there are no, "hard skill" requirements, but rather soft or proportional requirements, such as when the skills needed are represented as a value function, and the WAE attempts to maximize the value of each assignment. Utilizing the example above, the function might assign 100 points to assigning the work item to a reservation agent, and an additional 30 points to a French capable agent, 10 points to English speaking agent, and −100 points to any other language. As the algorithms execute, there will be a strong bias to get the call to a reservation agent, some bias to get to French over English speaking agent, and a strong bias against other languages.

SUMMARY

It is with respect to the above issues and other problems that the embodiments presented herein were contemplated. In particular, WFM could benefit significantly from information obtained from a WAE. A WAE can provide information about what decisions were made (or not made) for agent/customer matches, but the information considered may include the skills that were available at the time the agent/customer match was made and why the WAE made the decision(s) it did at the time the agent/customer match was made.

Provided with respect to certain embodiments, the feed from the assignment algorithm of the WAE may be captured in order to get statistics about what skills were actually needed when a routing decision was made and make those statistics available to determine what skills will be needed in the future. Additionally, a feed from the algorithm of the WAE, including capturing the relative values of the calculation of the routing function is provided and made available, such as to the WFM. In this way, the WFM may then balance the interest in getting, for example, more French agents staffed against the cost of doing so by executing a similar "value function vs. cost of labor" calculation during the prediction process to result in a optimal staffing proposal from a needs and a cost basis.

Certain embodiments disclosed herein provide a mechanism for the WAE to share information with the WFM to provide a more comprehensive set of data to enable more accurate WFM forecasting. For example, a customer of a contact center may have a preference for a Spanish-speaking agent. A work item from such a customer may time out waiting for an available Spanish-speaking agent. The work item may also time out waiting for an available Spanish-English bilingual agent. The work item may ultimately be assigned to an English-only speaking agent, but that match does not accurately reflect the need for (additional) Spanish-speaking and/or bilingual agents, thus reinforcing the usage of English speaking agents when Spanish speaking agents are the actual need. While the contact may be successfully processed, capturing the initial intention (e.g., routing the contact to an agent with some capacity to speak Spanish), is now captured to provide, with respect to certain embodiments herein, data to a WFM regarding the actual skills requested for the processing of contacts by the contact center.

In another example, a Polish-speaking customer may call in to the contact center, the call being a work item. If the Polish-speaking customer also speaks sufficient English, the resulting work item may be completed by an English speaking agent, further skewing the data as the work item indicates English speaking agents satisfactorily processed the contact. Furthermore, hiring Polish-speaking agents may represent an exceptionally high cost as compared to those that speak English. However, the investment may be justified. A cost/benefit analysis may need to be performed on desired virus actual skills of the agents processing the work items to determine the best course of action. For example, if the company services a sufficient number of Polish-speaking customers, having additional Polish-speaking agents may dramatically improve customer satisfaction and provide additional revenue through upselling, and thereby justifying the addition of more of the Polish-speaking agents.

In another embodiment, an algorithm is disclosed which may capture the decisions made by the WAE, such as at a time when the skills desired to process the requirement become known, and send the data related to such decisions to the workforce management system (e.g., information which may include available skills, tradeoffs, advocate algorithm data, goals/metrics alignment, etc.). The WAE may provide continuous and/or periodic information to the workforce management system. The WAE may push the information to the WFM, such as by an application program interface, messaging system, or other communication means. As a benefit, the information feed allows for significant improvements in forecasting resource demands for short-term, long-term, and event-specific durations.

Certain embodiments provided herein enable the gathering, computation, and forecasting of resources that may have currently have limited availability and rarely receive requests by extracting the failed allocation/route attempts from the routing algorithm of the WAE. Additional embodiments enable unstaffed skills/resources to be configured in the WAE which may provide insight into potential staff/resource usage.

In one embodiment, a method is disclosed, comprising: receiving a work item representing a contact with a contact center; determining an attribute of the work item; executing a WAE operable to route the work item to an agent of the contact center for processing; based on the execution of the WAE, identifying a preferred agent and a qualified but non-preferred agent, each being an agent of the contact center; routing the work item to the qualified but non-preferred agent; and reporting the fact that the preferred agent did not have the work item routed thereto.

In another embodiment, a system is disclosed, comprising: a communication interface, operable to receive a work item representing a contact with a contact center and route the work item to an agent of the contact center for processing; and a processor, operable to perform: determining an attribute of the work item; executing a WAE operable to route the work item to an agent of the contact center for processing; based on the execution of the WAE, identifying a preferred agent and a qualified but non-preferred agent, each being an agent of the contact center; routing the work item to the qualified but non-preferred agent; and reporting the fact that the preferred agent did not have the work item routed thereto.

In yet another embodiment, a non-transitory computer readable medium is disclosed with instructions thereon that when read by the computer cause the computer to perform: receiving a work item representing a contact with a contact center; determining an attribute of the work item; executing a WAE operable to route the work item to an agent of the contact center for processing; based on the execution of the WAE, identifying a preferred agent and a qualified but non-preferred agent, each being an agent of the contact center; routing the work item to the qualified but non-preferred agent; and reporting the fact that the preferred agent did not have the work item routed thereto.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
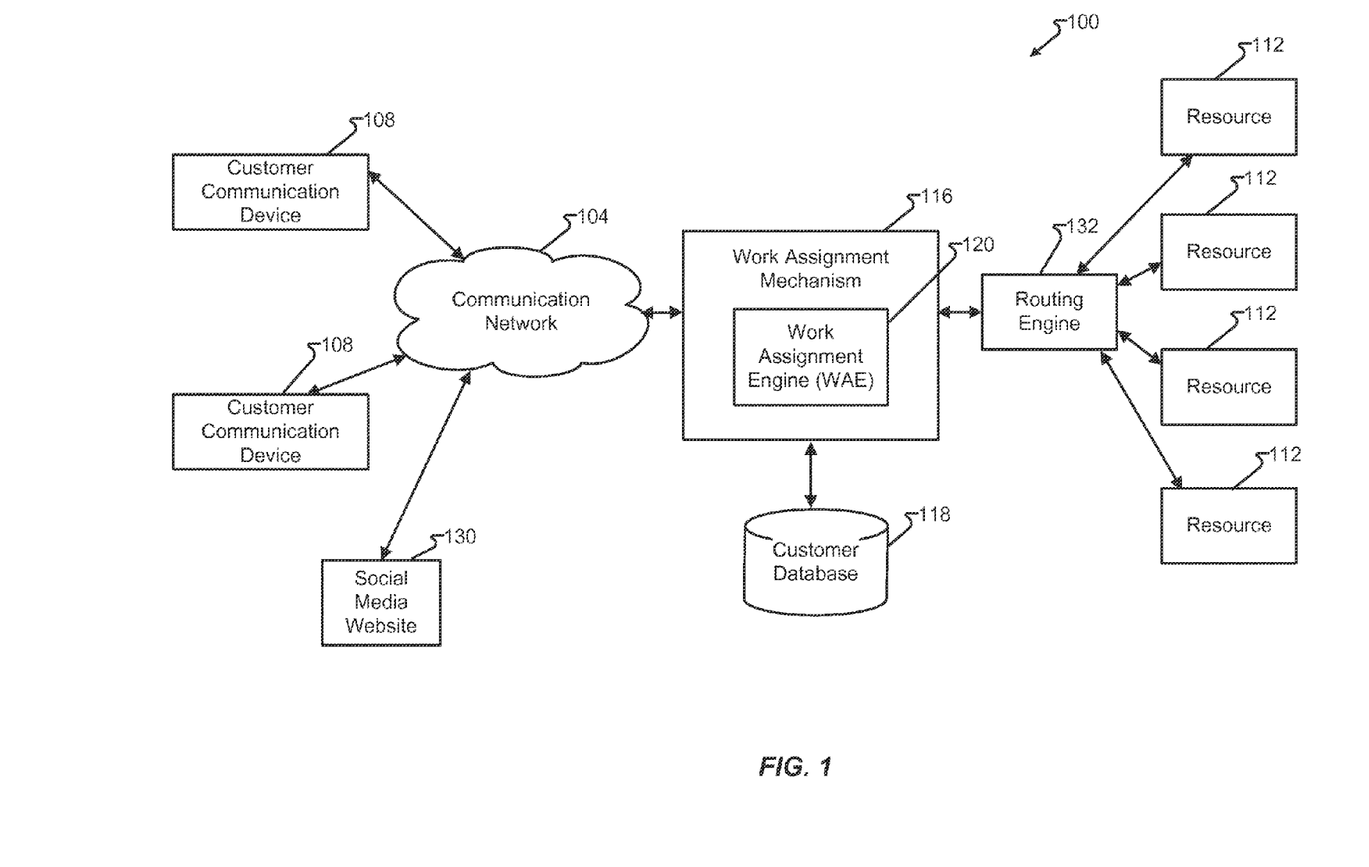
FIG. 1 depicts a communication system in accordance with embodiments of the present disclosure.

With reference now to FIG. 1, communication system 100 will be described in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from customer communication devices 108. Additionally, social media website 130 may be utilized to provide one means for a resource 112 to receive and/or retrieve contacts and connect to a customer of a contact center. Customers may utilize their respective customer communication device 108 to send/receive communications utilizing social media website 130.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server, such as social media website 130. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112.

Although the routing engine 132 is depicted as being separate from the work assignment mechanism 116, the routing engine 132 may be incorporated into the work assignment mechanism 116 or its functionality may be executed by the WAE 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a WAE 120 which enables the work assignment mechanism 116 to make intelligent routing decisions for work items. In some embodiments, the WAE 120 is configured to administer and make work assignment decisions in a queueless contact center, as is described in U.S. patent application Ser. No. 12/882,950, the entire contents of which are hereby incorporated herein by reference. In other embodiments, the WAE 120 may be configured to execute work assignment decisions in a traditional queue-based (or skill-based) contact center.

The WAE 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In one embodiment, a message is generated by customer communication device 108 and received, via communication network 104, at work assignment mechanism 116. The message received by a contact center, such as at the work assignment mechanism 116, is generally, and herein, referred to as a "contact." Routing engine 132 routes the contact to at least one of resources 112 for processing.

Figure 2:
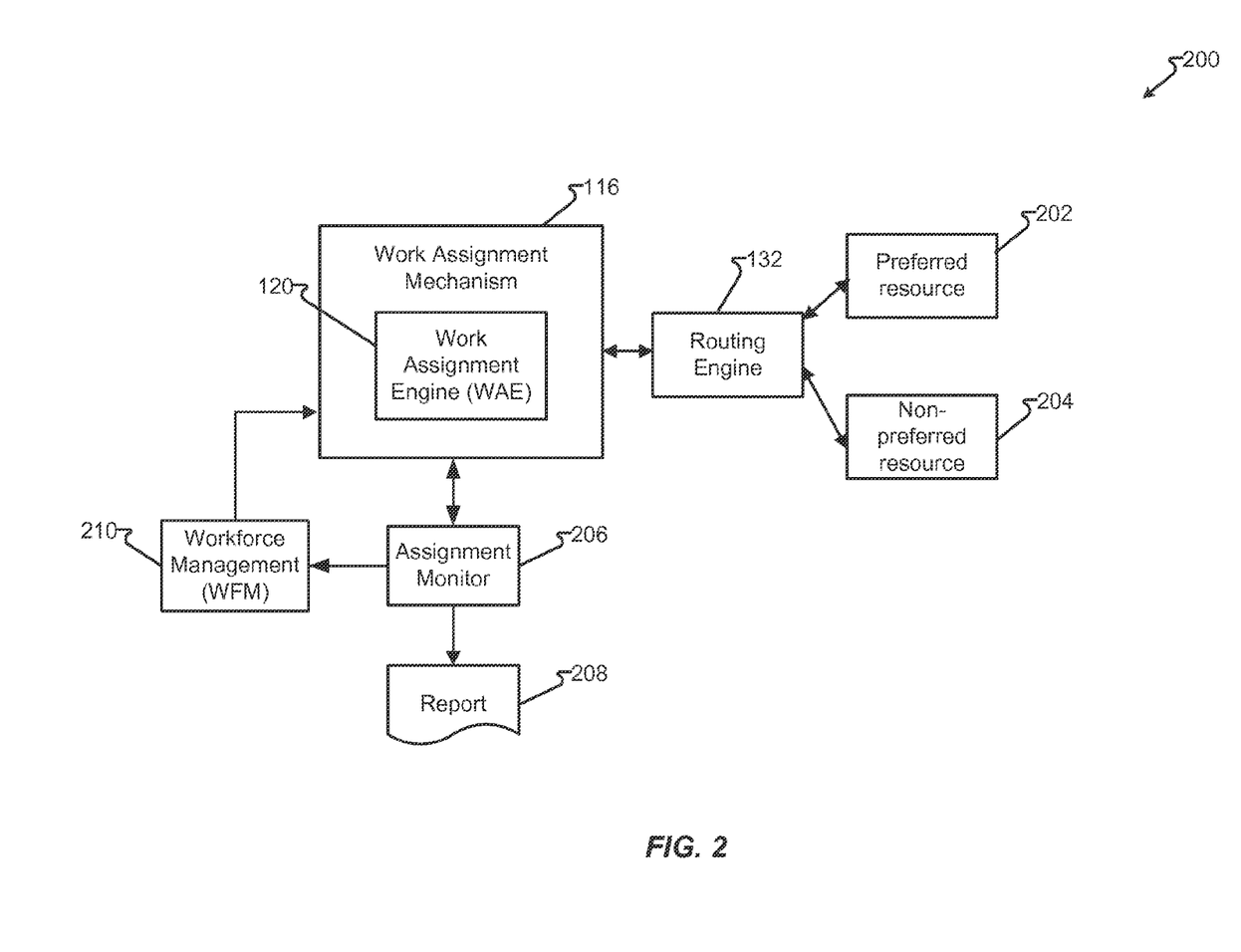
FIG. 2 depicts a contact center in accordance with embodiments of the present disclosure.

With reference now to FIG. 2, components of a contact center 200 will be described in accordance with at least some embodiments of the present disclosure. Contact center components 200 are illustrated to include, in part, a subset of components illustrated with respect to system 100 and FIG. 1 to avoid unnecessarily complicating the description. Embodiments incorporating the components of FIG. 1 as well as other configurations are also contemplated without departing from the disclosure provided herein.

In one embodiment, work assignment mechanism 116 receives a work item in the contact center. WAE 120 determines a particular resource, such as a resource 112 of FIG. 1. Preferred resource 202 and non-preferred resource 204 are each instances of resources 112. In an ideal state, WAE 120 would determine the best resource and cause routing engine 132 to provide the work item to that best resource, namely preferred resource 202. However, preferred resource 202 may not be available or may not become available within an acceptable time. For example, if a work item requested an expert Spanish speaker, but expert-level Spanish speaker, preferred resource 202, will not become available to accept the work item within a period of an acceptable delay, then non-preferred resource 204 may be an advanced, intermediate, or otherwise competent Spanish-speaker and have the contact routed thereto.

In one embodiment, assignment monitor 206 is integrated into WAE 120, WAE 120 is integrated into assignment monitor 206, and/or assignment monitor 206 is in communication with WAE 120. In another embodiment, assignment monitor 206 may be integrated in, integrated by, or in communication with work assignment mechanism 116, and/or routing engine 132. In yet another embodiment, assignment monitor 206 may be in communication with one or more of preferred resource 202 and non-preferred resource 204, such as when preferred resource 202 and non-preferred resource 204 are electronic components (e.g., communication devices) or themselves electronic agents. However, in other embodiments, preferred resource 202 and non-preferred resource 204 are human agents.

In another embodiment, assignment monitor 206 formats report 208. Report 208 may be specific to a particular one of preferred resource 202 and/or non-preferred resource 204 (e.g., "Contact primarily spoke French. Agent #123 was the preferred agent. Agent #123 was not predicted to be available for 23 minutes. Agent #456 was the non-preferred agent selected to process the contact."). In other embodiments, report 208 may be less verbose as more of a summary (e.g., "16 non-preferred agents selected based on language." "12 non-preferred agents selected based on skill: international reservations." etc.). Report 208 may be produced on a period basis and/or on demand. It such a manner, a contact center may be provided with information on the skills that were desired and not simply the skills that were utilized.

In another embodiment, WFM 210 receives data from assignment monitor 206. WFM 210 is operable to indicate the selection and/or scheduling of agents. WFM 210 may have a lead time of a few seconds (e.g., "Allocate 5 agents working on campaign A to campaign B.") to days, weeks, or even longer (e.g., "No more than 3% of agents may take vacation time during the last week of May."). WFM 210, receiving data from assignment monitor 206 may then provide more intelligent decision making based not just on completed contacts, but on what the preferred agent attributes contained and why the preferred agent was not utilized.

It may be expected that preferred resource 202 is not selected due to preferred resource 202 being engaged with another contact and/or having contacts already enqueued for preferred resource 202. However, preferred resource 202 may be unavailable, or at least unavailable within an acceptable amount of time, due to a break, absence from work, not scheduled for a shift, engaged with post-call/pre-call training and/or record keeping. For example, preferred resource 202 may be unavailable because they are scheduled for training and not available to accept any contacts. WFM 210 may have knowledge of outside events affecting scheduling of agents, such as preferred resource 202. For example, holiday buying is known to increase the need for agents and/or agents with a particular skill set (e.g., upselling). In one embodiment, WFM 210 is operable to receive data from assignment monitor 206 and adjust staffing accordingly (e.g., The demand for French speaking agents on Fridays indicates that those agents who speak French should attend Monday's training session and be available to accept calls on Fridays, Polish speaking contacts are under-represented/increasing—hire more Polish speaking agents, etc.).

Figure 3:
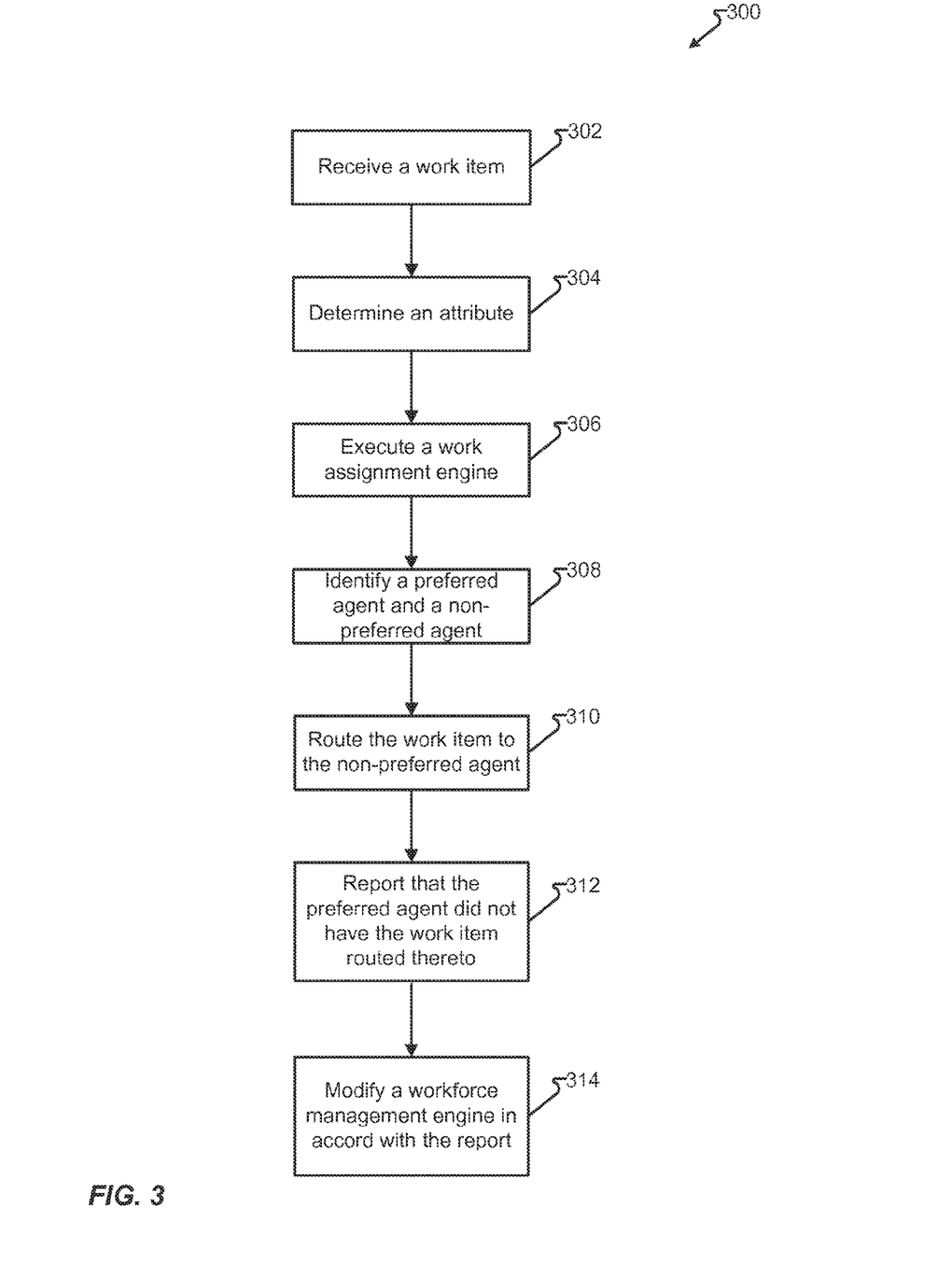
FIG. 3 depicts a process for reporting work items in accordance with embodiments of the present disclosure.

With reference now to FIG. 3, process 300 for reporting work items in accordance with at least some embodiments of the present disclosure. In one embodiment, step 302 receives a work item. The work item may be received via social media website 130 or customer communication device 108 via communication network 104 for processing by work assignment mechanism 116, WAE 120, and/or routing engine 132 to one or more resources 112.

Step 304 determines an attribute of the work item. The attribute being determined as a matter of design choice to indicate which agents, being resources 112, will and will not be eligible to receive the work item. In one embodiment, the attribute is a language skill, such that, for example, agents who have at least a minimum competency in Spanish who will be eligible to receive a work item having a "Spanish"

language attribute and/or a specific level of Spanish language requested (e.g., native speaker, fluent, intermediate, etc.). In another embodiment, the attribute may be knowledge of a business product or service associated with the contact center. For example, the attribute may be knowledge of international flight reservations, whereby an agent with such an attribute, or a sufficient rating within the attribute, is eligible to receive work items associated with international flight revelations and agents without the attribute, or without a sufficient rating within the attribute, is not eligible to receive such a work item. An attribute may be present or absent or associated with a range of skill levels (e.g., novice-expert, 1-5, etc.) of an agent and/or demand associated with the work item (e.g., helpful, preferred, essential; 1-5; etc.). As can be appreciated, a plurality of attributes may be utilized in combination (e.g., international reservations agent who is fluent in Spanish, etc.)

Step 306 executes the WAE and, in step 308, a preferred agent and a non-preferred but qualified agent are selected. Step 310 routes the work item to the non-preferred agent. Step 310 may be executed for various reasons. One more common reason is that the preferred agent is unavailable to accept the work item and/or the wait time for the preferred agent would be above a threshold of acceptability. Accordingly, the qualified but non-preferred agent is selected to process the work item. For example, a Spanish speaking customer calls a contact center and the resulting work item causes the identification of a preferred agent, for example, an agent with a high proficiency in the Spanish language.

In another embodiment, the preferred agent may be an unavailable, non-existent, and/or ideal agent. For example, a work item associated with a bilingual customer (e.g., Polish-English) may be associated with a preferred agent that speaks Polish but no such agent is available, or possibly no such agent exists within the employment of the contact center. Accordingly, work items having a Polish-English language attribute may always routed to non-preferred but qualified agents (e.g., English only, English-Spanish bilingual, English-French bilingual, etc.).

In another embodiment the preferred and non-preferred but qualified agent may be determined iteratively. For example, an agent with Spanish expertise is desired, but the wait time is above a threshold and, therefore, a non-preferred but qualified agent with intermediate Spanish skills is selected. If the intermediate-skilled agent is unavailable or subject to unacceptable wait times, then the intermediate-skilled agent may become the preferred agent and a non-preferred but qualified agent, such as one with basic Spanish abilities, may be selected. Step 312 may then report the series of downgrades to qualified but non-preferred agents.

In step 314, a WFM engine, such as WFM 210, receives the report and alters the operation of the contact center to which may mitigate future incidences of routing of work items to the non-preferred but qualified agent. For example, WFM engine may indicate that Polish speaking agents need to be hired to accept work items, that Spanish speaking agents should be scheduled to work or not work certain shifts, etc. Step 314 may be manual and/or automatically executed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    receiving a work item representing a contact with a contact center;
    determining an attribute of the work item;
    executing, by a processor, a work assignment engine operable to route the work item to an agent of the contact center for processing;

based on the execution of the work assignment engine, identifying, by the processor, a preferred agent and a qualified but non-preferred agent, each being an agent of the contact center;

selecting, by the processor executing the work assignment engine, the qualified but non-preferred agent to receive the work item and not selecting the preferred agent;

routing, by the processor, the work item to the qualified but non-preferred agent; and reporting, by the processor, the fact that the preferred agent did not have the work item routed thereto.

2. The method of claim 1, wherein:
the work item is one of a plurality of work items;
the step of determining the attribute of the work item, further comprises, determining an attribute for individual ones of the plurality of work items;
the step of executing the work assignment engine operable to route the work item to an agent, further comprises executing the work assignment engine to route the individual ones of the work item to an agent for processing;
based on the execution of the work assignment engine, performing the step of identifying the preferred agent and the qualified but non-preferred agent for the individual ones of the plurality of work items;
routing the individual ones of the work items to the qualified but non-preferred agent; and
the step of reporting further comprises, reporting for the plurality of work items, the fact that the preferred agent did not have the individual ones of the work items routed thereto.

3. The method of claim 2, wherein the reporting is performed on a periodic basis.

4. The method of claim 2, wherein the reporting further comprises a summary of the attribute and the number of the individual ones that contain the attribute.

5. The method of claim 1, further comprising:
modifying a workforce management engine, operable to allocate at least one agent of the contact center having the attribute to a work shift selected, at least in part, to mitigate the instances of future preferred agent not having a future work item routed thereto.

6. The method of claim 1, wherein the preferred agent is determined as having a skill set more closely matching the attribute than the skill set of the qualified but non-preferred agent.

7. The method of claim 1, further comprising:
determining a preferred agent skill score, indicating a degree of match between the preferred agent skill set and the attribute;
determining a qualified but non-preferred agent skill score, indicating a degree of match between the qualified but non-preferred agent skill set and the attribute;
determining a skill requirement score of the attribute; and
wherein the preferred agent is determined as having a skill set more closely matching the skill requirement score as compared to the qualified but non-preferred agent, based on the comparison of the preferred agent skill score and the skill requirement score.

8. The method of claim 1, wherein the qualified but non-preferred agent is determined by a capacity to accept the work item sooner than the preferred agent.

9. The method of claim 1, wherein the preferred agent is a hypothetical ideal agent having a skill set matching the attribute.

10. A system, comprising:
a communication interfacethat receives a work item representing a contact with a contact center and routes the work item to an agent of the contact center for processing; and
a processor that performs:
determining an attribute of the work item;
executing a work assignment engine operable to route the work item to an agent of the contact center for processing;
based on the execution of the work assignment engine, identifying a preferred agent and a qualified but non-preferred agent, each being an agent of the contact center;
selecting the qualified but non-preferred agent to receive the work item and not selecting the preferred agent;
routing the work item to the qualified but non-preferred agent; and
reporting the fact that the preferred agent did not have the work item routed thereto.

11. The system of claim 10, wherein the processor is further operable to perform:
modifying a workforce management engine, operable to allocate at least one agent of the contact center having the attribute to a work shift selected, at least in part, to mitigate the instances of future preferred agent not having a future work item routed thereto.

12. The system of claim 10, wherein the preferred agent is determined as having a skill set more closely matching the attribute than the skill set of the qualified but non-preferred agent.

13. The system of claim 10, wherein the processor is further operable to perform:
determining a preferred agent skill score, indicating a degree of match between the preferred agent skill set and the attribute;
determining a qualified but non-preferred agent skill score, indicating a degree of match between the qualified but non-preferred agent skill set and the attribute;
determining a skill requirement score of the attribute; and
wherein the preferred agent is determined as having a skill set more closely matching the skill requirement score as compared to the qualified but non-preferred agent, based on the comparison of the preferred agent skill score and the skill requirement score.

14. The system of claim 10, wherein the qualified but non-preferred agent is determined by a capacity to accept the work item sooner than the preferred agent.

15. The system of claim 10, wherein the preferred agent is an ideal agent having a skill set matching the attribute.

16. A system, comprising:
means to receive, by at least one processor, a work item representing a contact with a contact center;
means to determine, by the at least one processor, an attribute of the work item;
means to execute, by the at least one processor, a work assignment engine operable to route the work item to an agent of the contact center for processing;
based on the execution of the work assignment engine, means to identify, by the at least one processor, a preferred agent and a qualified but non-preferred agent, each being an agent of the contact center;
means to select, by the at least one processor, the qualified but non-preferred agent to receive the work item and not selecting the preferred agent;

means to route, by the at least one processor, the work item to the qualified but non-preferred agent; and means to report, by the at least one processor, the fact that the preferred agent did not have the work item routed thereto.

17. The system of claim 16, wherein:

the work item, further comprises, a plurality of work items;

the means for determining the attribute of the work item, further comprises, means for determining an attribute for individual ones of the plurality of work items;

the means for executing the work assignment engine operable to route the work item to an agent, further comprises means for executing the work assignment engine to route the individual ones of the work item to an agent;

based on the execution of the work assignment engine, means for performing the identifying of the preferred agent and the qualified but non-preferred agent for the individual ones of the plurality of work items;

means for selecting the qualified but non-preferred agent to receive the work item and not selecting the preferred agent;

means for routing the individual ones of the work items to the qualified but non-preferred agent; and the means for reporting further comprises, means for reporting for the plurality of work items, the fact that the preferred agent did not have the individual ones of the work items routed thereto.

18. The system of claim 16, further comprising:

means for modifying a workforce management engine, operable to allocate at least one agent of the contact center having the attribute to a work shift selected, at least in part, to mitigate the instances of future preferred agent not having a future work item routed thereto.

19. The system of claim 16, further comprising means to determine, by the at least one processor, the preferred agent as having a skill set more closely matching the attribute than the skill set of the qualified but non-preferred agent.

20. The system of claim 16, wherein the preferred agent is a hypothetical ideal agent having a skill set matching the attribute.

* * * * *

UNITED STATES PATENT AND TRADEMARK OFFICE
CERTIFICATE OF CORRECTION

| | | |
|---|---|---|
| PATENT NO. | : 9,531,880 B2 | |
| APPLICATION NO. | : 14/296208 | |
| DATED | : December 27, 2016 | |
| INVENTOR(S) | : George Erhart, Valentine C. Matula and David Skiba | |

It is certified that error appears in the above-identified patent and that said Letters Patent is hereby corrected as shown below:

In the Claims

At Column 12, Line 2, please delete "interfacethat" and insert --interface that-- therein.

Signed and Sealed this
Twenty-first Day of March, 2017

Michelle K. Lee
*Director of the United States Patent and Trademark Office*